US009553912B2

(12) United States Patent
Bae et al.

(10) Patent No.: US 9,553,912 B2
(45) Date of Patent: Jan. 24, 2017

(54) METHOD AND APPARATUS FOR TRANSMITTING MEDIA CONTENT VIA A SINGLE PORT OR MULTIPLE PORTS

(75) Inventors: Seong Jun Bae, Daejeon-si (KR); Jin Young Lee, Daejeon-si (KR); Jung Won Kang, Daejeon-si (KR); Soon heung Jung, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 762 days.

(21) Appl. No.: 13/980,605

(22) PCT Filed: Jan. 19, 2012

(86) PCT No.: PCT/KR2012/000509
§ 371 (c)(1),
(2), (4) Date: Jul. 19, 2013

(87) PCT Pub. No.: WO2012/099426
PCT Pub. Date: Jul. 26, 2012

(65) Prior Publication Data
US 2013/0297817 A1 Nov. 7, 2013

(30) Foreign Application Priority Data

Jan. 19, 2011 (KR) .................. 10-2011-0005489
Jan. 19, 2012 (KR) .................. 10-2012-0006374

(51) Int. Cl.
*G06F 15/16* (2006.01)
*H04L 29/06* (2006.01)
(Continued)

(52) U.S. Cl.
CPC .......... *H04L 65/608* (2013.01); *H04N 21/236* (2013.01); *H04N 21/2381* (2013.01);
(Continued)

(58) Field of Classification Search
CPC . H04L 65/608; H04N 21/236; H04N 21/2381; H04N 21/4622; H04N 21/6125; H04N 21/643; H04N 21/8451
(Continued)

(56) References Cited

U.S. PATENT DOCUMENTS

2009/0287841 A1* 11/2009 Chapweske ......... H04L 65/4084
709/231
2012/0054818 A1* 3/2012 Noh ..................... H04N 21/222
725/143

FOREIGN PATENT DOCUMENTS

KR 10-2006-0087434 A 8/2006
KR 10-2006-0101219 A 9/2006
(Continued)

OTHER PUBLICATIONS

International Search Report issued Sep. 28, 2012 with respect to counterpart International Application No. PCT/KR2012-000509 (6 pages, in Korean, with complete English translation).

*Primary Examiner* — Wing F Chan
*Assistant Examiner* — Joseph Maniwang
(74) *Attorney, Agent, or Firm* — NSIP Law

(57) ABSTRACT

Disclosed is a method for generating a substream ID usable in transmitting media content based on a plurality of scenarios, and allocating the substream ID for transmitting media. A method for allocating an ID for transmitting media content comprises: a step of generating a substream ID containing information required for transmitting the media content based on a certain scenario from among a plurality of scenarios; and a step of transmitting the substream ID to a client. According to the present invention, a header for the transmission of media may be simplified, media content may be transmitted regardless of the number of ports, number of servers, and presence/absence of additional information, an application to be introduced in the future may be used, and
(Continued)

backward compatibility for an existing media content transmission system may be provided.

16 Claims, 12 Drawing Sheets

(51) Int. Cl.
    *H04N 21/236*     (2011.01)
    *H04N 21/2381*     (2011.01)
    *H04N 21/462*     (2011.01)
    *H04N 21/61*     (2011.01)
    *H04N 21/643*     (2011.01)
    *H04N 21/845*     (2011.01)

(52) U.S. Cl.
    CPC ..... *H04N 21/4622* (2013.01); *H04N 21/6125* (2013.01); *H04N 21/643* (2013.01); *H04N 21/8451* (2013.01)

(58) Field of Classification Search
    USPC ........................................................ 709/231
    See application file for complete search history.

(56) References Cited

FOREIGN PATENT DOCUMENTS

| KR | 10-2009-0037334 A | 4/2009 |
|----|-------------------|--------|
| KR | 10-2010-0065017 A | 6/2010 |

\* cited by examiner

METHOD AND APPARATUS FOR TRANSMITTING MEDIA CONTENT VIA A SINGLE PORT OR MULTIPLE PORTS

CROSS-REFERENCE TO RELATED APPLICATIONS

This application is a national stage application under 35 USC 371 of International Application No. PCT/KR2012/000509 filed on Jan. 19, 2012, which claims the benefit of Korean Application No. 10-2011-0005489 filed on Jan. 19, 2011, and Korean Application No. 10-2012-0006374 filed on Jan. 19, 2012, in the Korean Intellectual Property Office, the entire disclosures of which are incorporated herein by reference for all purposes.

TECHNICAL FIELD

The present invention relates to a method and apparatus of transporting a media content, and more particularly, to a method and apparatus of transporting a media content in various environments including a single port or multiple ports.

BACKGROUND ART

After standardization of MPEG-2, new video compression standards (or audio compression standards) such as MPEG-4, H.264/AVC, scalable video coding (SVC), and the like, have been constantly developed over the past ten years. In addition, the respective new standards have expanded a utilization area of an MPEG standard while forming a new market. However, a transport technology such as an MPEG-2 transport system (TS) has continuously been widely used in digital broadcasting, mobile broadcasting (T-DMB, DVB-H, or the like), or the like, on the market for about twenty years and has been widely used even in multimedia transport through the Internet, that is, an IPTV service, that was not considered at the time of establishing an MPEG-2 standard.

However, a multimedia transport environment of the present time has been significantly changed from a transport environment at the time of developing the MPEG-2 TS, For example, the MPEG-2 TS standard has been developed in consideration of multimedia data transport through an ATM network at the time of establishment thereof; however, it is hard to find an example of using the MPEG-2 TS standard for this object at present. In addition, requirements such as multimedia transport using the Internet, or the like, at the time of establishing the MPEG-2 TS standard were not considered, such that elements that is not efficient for the recent multimedia transport through the Internet are present. Therefore, establishment of a MPEG multimedia transport layer (MMT), which is a multimedia transport standard considering a multimedia service in the Internet matched to a changing multimedia environment has been recognized as a very importance problem in the MPEG.

The reason why the MMT has been standardized as a new transport technology standard in the MPEG as described above is that since the MPEG2-TS standard established before twenty years are not optimized for a recent IPTV broadcasting service, Internet environment, or the like, the international multimedia transport standard optimized for a recent multimedia transport environment in various heterogeneous networks has been urgently demanded.

As described above, in the recent multimedia transport through the various heterogeneous networks, multiple transport units have been simultaneously used. With hybrid transport using the multiple transport units, various applications have been attempted.

Further, in the case in which a media content is transported in an IP environment, a single port stream is generally configured in a unit of four values, that is, a source IP address, a destination IP address, a source port number, and a destination port number of a sender and a receiver, and an application is formed in a port stream unit. In this case, how many ports are opened and used according to the application and which protocol (UDP or TCP) is selected are entirely an application implementation issue and may be freely selected, such that configurations of various transport scenarios are possible according to a degree of freedom of port mapping for each content component, selection of L3 protocol, or the like, due to characteristics thereof.

RELATED ART DOCUMENT (Patent Document 1) Korean Patent Laid-Open Publication No. 10-2010-0065017 ("Apparatus for MPEG-2 TS file format using layered encoding of H.264 SVC multimedia data and method thereof", Electronics and Telecommunications Research Institute, Laid-Open Publication Date: Jun. 15, 2010)

DISCLOSURE

Technical Problem

As described above, in the case in which the media content is transported in the IP environment, various transport scenarios including a case of a single port or multiple ports, which protocol is selected, and a case of having an additional complementary representation such as scalable video coding (SVC) or multi-view coding (MVC) may be present. In the case in which separate ID fields are independently established for ID for transporting the media content according to the various scenarios as described above, the ID fields may be excessively increased.

Therefore, an object of the present invention for overcoming the above-mentioned problem is to provide a method of generating a substream ID capable of being used in transporting a media content according to multiple scenarios and transporting the media content based on the substream ID.

In addition, another object of the present invention is to provide an apparatus of generating a substream ID capable of being used in transporting a media content according to multiple scenarios and transporting the media content based on the substream ID.

Technical Solution

In an aspect, a method of transporting a media content from a server to a client is provided. The method includes: generating a substream ID including information to be allocated to a port of the client in order to transport a content component including at least one of a video stream, an audio stream, and a signaling stream to the client; transporting the substream ID to the client; and transporting the content component to the client over at least one port of the client.

In the transporting of the content component to the client, the content component may be transported over a heterogeneous network including an IP network.

The substream ID may be used in common in multiple scenarios.

In the multiple scenarios, at least one of the number of ports for transporting the media content, the number of servers transporting the media content, a type of components configuring the media content, and a coupling relation between the components may be different.

In the transporting of the substream ID to the client, the substream ID may be included in a header of an MMT D layer and then transported to the client.

The substream ID may further include information for supporting backward compatibility with an existing RTP payload type (PT).

In one of the multiple scenarios, multiple content components may be multiplexed and transported over a single port, and the substream ID may include information for distinguishing between the multiple content components.

In one of the multiple scenarios, signaling streams may be further transported over the signal port, and the substream ID may include information for distinguishing between the multiple content components and the signaling streams.

In one of the multiple scenarios, an additional complementary representation for implementing any one of scalable video coding (SVC), multi-view coding (MVC), and a 3D image may be further transported from the server to the client, and the substream ID may further include information for describing a coupling relation between the additional complementary representation and the content component.

In one of the multiple scenarios, the content component may be transported from multiple servers to at least one client, and the substream ID may further include information for distinguishing between the multiple servers.

In another aspect, an apparatus of transporting a media content from a server to a client is provided. The apparatus includes: a substream ID generating unit generating a substream ID including information to be allocated to a port of a client in order to transport a content component including at least one of a video stream, an audio stream, and a signaling stream to the client; a substream ID transporting unit transporting the substream ID to the client; and a component transporting unit transporting the content component to the client over at least one port of the client.

The component transporting unit may transport the content component over a heterogeneous network including an IP network.

The substream ID may be used in common in multiple scenarios.

In the multiple scenarios, at least one of the number of ports for transporting the media content, the number of servers transporting the media content, a type of components configuring the media content, and a coupling relation between the components may be different.

The substream ID transporting unit may allow the substream ID to be included in a header of an MMT D layer and then transports the substream ID to the client.

The substream ID may further include information for supporting backward compatibility with an existing RTP PT.

In one of the multiple scenarios, multiple content components may be multiplexed and transported over a single port, and the substream ID may include information for distinguishing between the multiple content components.

In one of the multiple scenarios, signaling streams may be further transported over the signal port, and the substream ID may include information for distinguishing between the multiple content components and the signaling streams.

In one of the multiple scenarios, an additional complementary representation for implementing any one of SVC, MVC, and a 3D image may be further transported from the server to the client, and the substream ID may further include information for describing a coupling relation between the additional complementary representation and the content component.

In one of the multiple scenarios, the content component may be transported from multiple servers to at least one client, and the substream ID may further include information for distinguishing between the multiple servers.

Advantageous Effects

As set forth above, with the method and apparatus of transporting a media content in a single port or multiple ports, the substream ID capable of being used in transporting the media content according multiple scenarios is generated and is allocated in order to transport the media content, thereby making it possible to provide a single ID field used in common in various transport scenarios.

Therefore, it is possible to transport the media content regardless of the number of ports, the number of servers, and whether or not additional information is present while simplifying a header for transporting the media content, receive an application to be introduced in future, and provide compatibility with an existing media content transport scheme.

MODE FOR INVENTION

Figure 1:
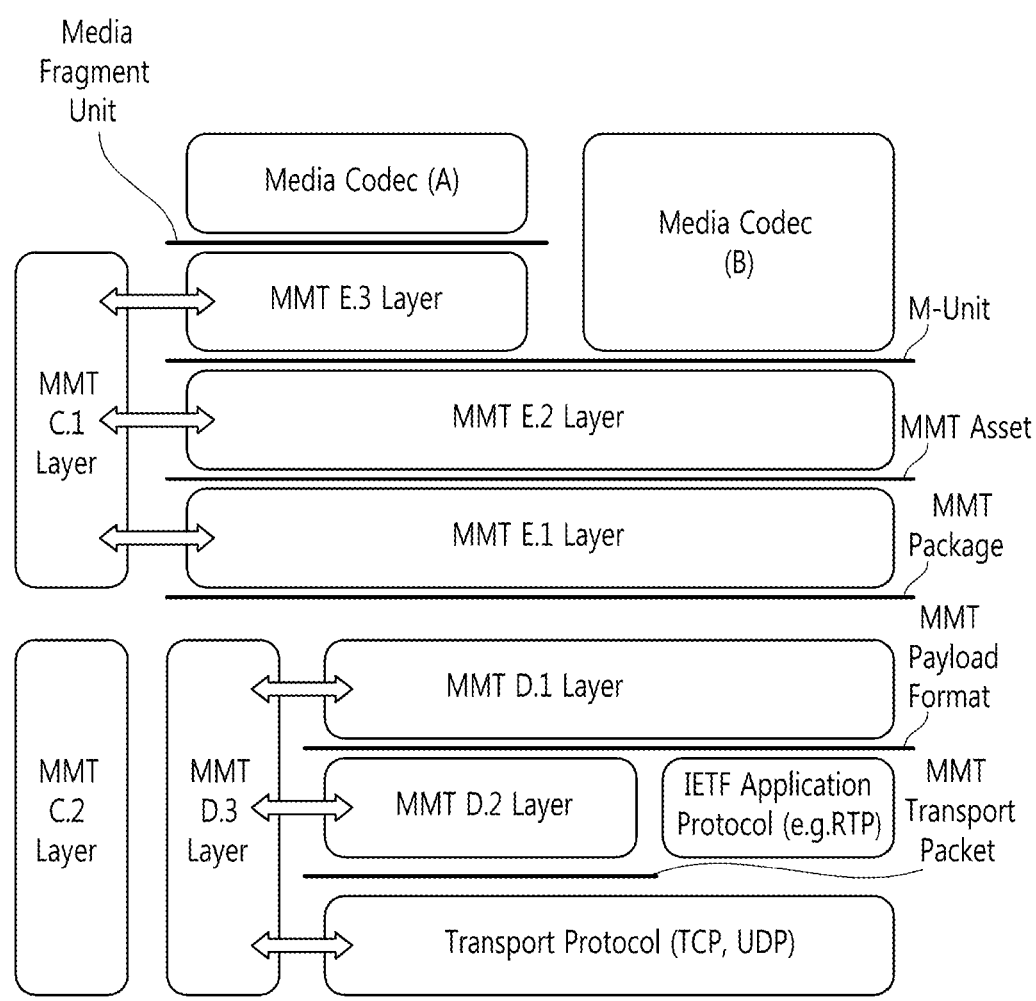
FIG. 1 is a conceptual diagram showing an MPEG multimedia transport (MMT) layer structure.

Since the present invention may be variously modified and have several exemplary embodiments, specific exemplary embodiments will be shown in the accompanying drawings and be described in detail.

However, it is to be understood that the present invention is not limited to the specific exemplary embodiments, but includes all modifications, equivalents, and substitutions included in the spirit and the scope of the present invention.

Terms used in the specification, 'first', 'second', etc. can be used to describe various components, but the components are not to be construed as being limited to the terms. The terms are only used to differentiate one component from other components. For example, the 'first' component may be named the 'second' component and the 'second' component may also be similarly named the 'first' component, without departing from the scope of the present invention. A term 'and/or' includes a combination of a plurality of related described items or any one of the plurality of related described items.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present invention will be described in more detail with reference to the accompanying drawings. In order to facilitate the general understanding of the present invention in describing the present invention, through the accompanying drawings, the same reference numerals will be used to describe the same components and an overlapped description of the same components will be omitted.

FIG. 1 is a conceptual diagram showing an MPEG multimedia transport (MMT) layer structure.

Referring to FIG. 1, the MMT layer includes functional areas of an encapsulation layer, a delivery layer, and a control layer. The MMT layer is operated over the transport layer.

The encapsulation layer (E-layer) may perform, for example, a packetization function, fragmentation function, a synchronization function, a multiplexing function, and the like, of transported media.

The E-layer may include an MMT E.1 layer, an MMT E.2 layer, and an MMT E.3 Layer as shown in FIG. 1.

The E.3 layer encapsulates a media fragment unit (MFU) provided from a media codec (A) layer to generate an M-unit.

The MFU may have a format carrying a data unit capable of being independently consumed in a media decoder and independent from any specific codec. The MFU may be, for example, a picture or a slice of a video.

The M-unit may be configured of one MFU or multiple MFUs and have a format carrying one access unit or multiple access units and independent from any specific codec.

The E.2 layer encapsulates the M-unit generated in the E.3 layer to generate an MMT asset.

The MMT asset, which is a data entity configured of one M-unit or multiple M-units from a single data source, is a data unit in which composition information and transport characteristics are defined. The MMT asset may correspond to packetized elementary streams (PESs), and corresponds to, for example, a video, an audio, program information, an MPEG-U widget, a JPEG image, an MPEG 4 file format, an MPEG transport stream (M2TS), or the like.

The E.1 layer encapsulates the MMT asset generated in the E.2 to generate an MMT package.

The MMT package may be configured of one MMT asset or multiple MMT assets together with additional information such as composition information and transport characteristics. The compositions information may include information on a relationship between the MMT assets, and further include information for indicating a relationship between multiple MMT packages in the case in which one content is configured of the multiple MMT packages. The transport characteristics may include transport characteristics information in order to determined a delivery condition of the MMT asset or the MMT packet, and may include, for example, traffic description parameter and QoS descriptor. The MMT package may correspond to a program of an MPEG-2 TS.

The delivery layer may perform, for example, network flow multiplexing, network packetization, QoS control, and the like, of a media transported over a network.

The delivery layer (D-layer) may include an MMT D.1 layer, an MMT D.2 layer, and an MMT D.3 Layer as shown in FIG. 1. A substream ID according to an exemplary embodiment of the present invention may be included in a header of the MMT D layer (the delivery layer) and then transported to a client.

The D.1 layer receives the MMT package in the E.1 layer to generate an MMT payload format. The MMT payload format is a format for transporting the MMT asset and transporting information to be consumed by another existing application transport protocol such as an MMT application protocol or an RTP. The MMT payload may include a fragment of the MFU together with information such as AL-FEC.

The D.2 layer receives the MMT payload format generated in the D.1 layer to generate an MMT transport packet or an MMT packet. The MMT transport packet or the MMT packet is a data format used in an application transport protocol for the MMT.

The D.3 layer provides a function capable of exchanging information between layers by a cross-layer design to support QoS. For example, the D.3 layer may perform QoS control using QoS parameters of MAC/PHY layers.

The control layer may perform, for example, a session initialization/control/management function, a server based and/or client based trick mode function, a service discovery function, a synchronization function, and the like, of the transported media.

The control layer (C-layer) may include an MMT C.1 layer and an MMT C.2 layer as shown in FIG. 1.

The C.1 layer may perform a service discovery function, a media session initialization/termination function, a media session presentation/control function, an interface function between the delivery (D) layer and the encapsulation (E)

layer, and the like. The C.1 layer may define a format of control messages between applications for media presentation session management.

The C.2 layer may define a format of control messages exchanged between delivery end-points of the D-layer regarding flow control, delivery session management, delivery session monitoring, error control, and hybrid network synchronization control.

The C.2 layer may include delivery session establishment and release, delivery session monitoring, flow control, error control, resource reservation for established delivery session, signaling for synchronization under a complicated delivery environment, and signaling for adaptive delivery in order to support an operation of the delivery layer. The C.2 layer may provide signaling required between a sender and a receiver. That is, the C.2 layer may provide the signaling required between the sender and the receiver in order to support the operation of the delivery layer as described above. In addition, the C.2 layer may perform an interface function between the delivery layer and encapsulation layer.

As described above, in an IP network, a single port stream is generally configured in a unit of four values, that is, a source IP address, a destination IP address, a source port number, and a destination port number of the sender and the receiver, and an application is formed in a port stream unit. In this case, how many ports are opened and used according to the application and which protocol (UDP or TCP) is selected are entirely an application implementation issue and may be freely selected, such that configurations of various transport scenarios are possible according to a degree of freedom of port mapping for each content component, selection of L3 protocol, or the like, due to characteristics thereof.

Scenario 1: Transport of Single Content Component Over Single Port Stream

Figure 2:
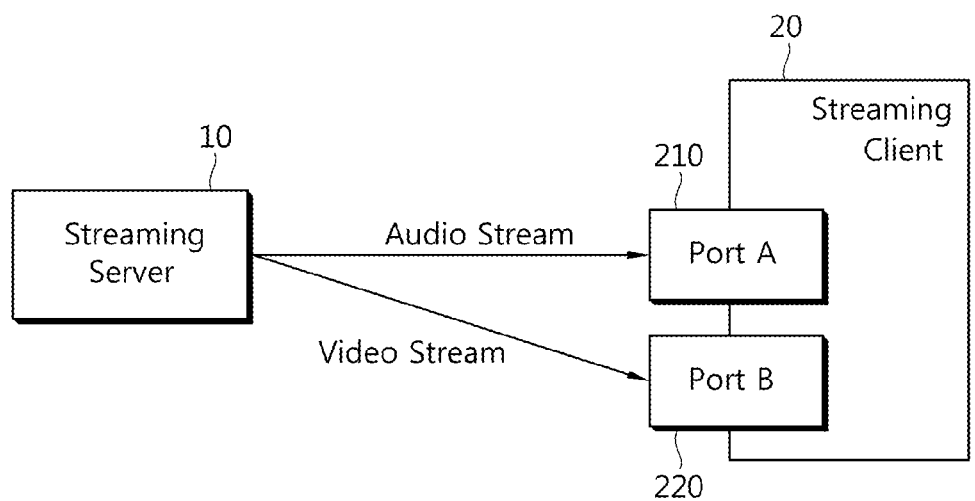
FIG. 2 shows transport of a single content component on a single port stream.

FIG. 2 shows transport of a single content component on a single port stream. As shown in FIG. 2, in transporting a media content from a server 10 to a client 20, a single content component may be transported over each port. That is, an audio stream may be transported to the client 20 over a port A 210, and a video stream may be transported to the client 20 over a port B 220. The scenario 1 in which the single content component is transported over each port is a scenario used in a general existing UDP/RPT based system and a scenario very widely used, such that it should necessarily be supported in order to ensure backward compatibility for the basic related art (for example, an RTP based scenario according to the related art).

Figure 3:
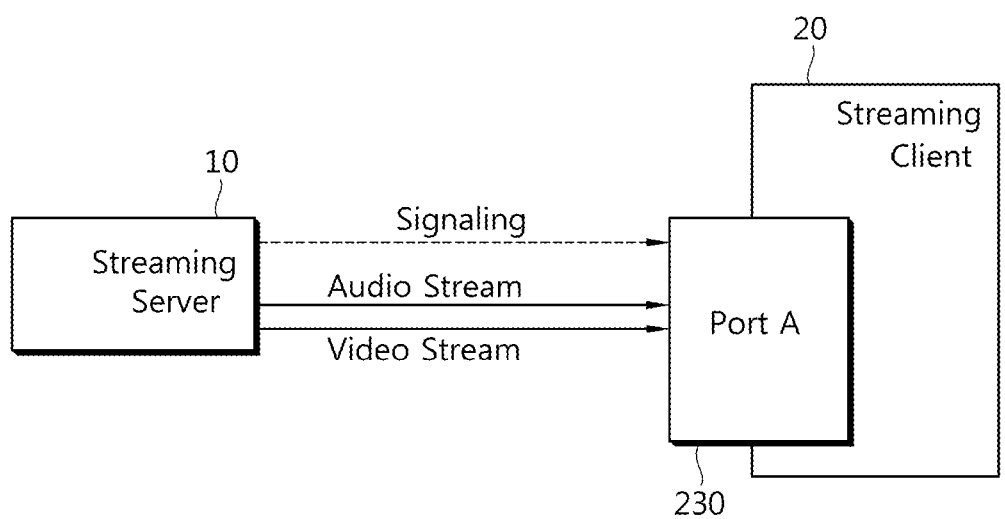
FIG. 3 shows transport of two or more content components on a single port stream.

Scenario 2: Transport of Two or More Content Components (and/or Signaling Data) Over Single Port Stream FIG. 3 shows transport of two or more content components on a single port stream. As shown in FIG. 3, in transporting a media content from a server 10 to a client 20, multiple content components including an audio stream and a video stream may be transported to the client 20 over a single port A 230. In addition, a signaling stream may be further transported to the client 20 over the single port A 230.

A current UDP/RTP based system does not suggest a public standard for multiplexing several content components and a signaling stream in a single port stream and is implemented based on various proprietary solutions. Since the number of used ports needs to be minimized in the case in which streaming is performed based on a UDP based stream, the scenario 2 in which the signaling stream is included in the single port stream to service one or more program session is very necessary in the IP network.

Figure 4:
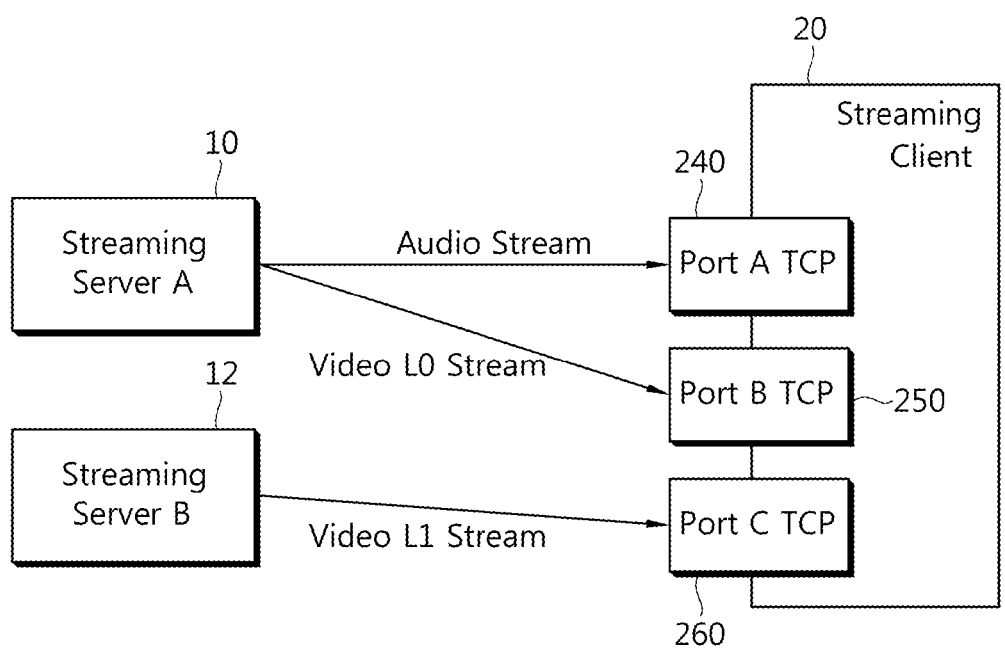
FIG. 4 shows a case in which a content component is multiplexed with one or more complementary representation data and then transported on two or more port streams.

Scenario 3: Transport of Multiple Content Components with One or More Complementary Representation Data Over Two or More Port Streams FIG. 4 shows a case in which a content component is multiplexed with one or more complementary representation data and then transported on two or more port streams.

Describing a tendency of a coding technology, coding methods having an additional complementary representation such as scalable video coding (SVC), multi-view coding, a 3 dimensional image, or the like, have been continuously developed. Therefore, among transport scenarios, the scenario 3 in which the complementary representations are transmitted and received from separate port streams or transmitted and received from separate servers has become gradually important. For example, in the case of the SVC including L0 and L1 video streams, as shown in FIG. 4, in transporting a media content from a server A 10 and/or a server B 12 to a client 20, an audio stream may be transported to the client 20 over a port A 240, a video stream L0 stream may be transported to the client 20 over a port B, and a video L1 stream may be transported to the client 20 over a port C.

As described above, the transport of the media content in the IP environment may be performed through various scenarios such as the scenario 1 to the scenario 3. Here, each of the scenarios may include an operation requiring an ID.

In the case of the scenario 1, an ID informing information on which media type the stream of a basically transported media content transports is required. In addition, an ID distinguishing between media types needs to maintain backward compatibility with a real time protocol payload type (RTP PT: 7-bit field) that has been widely used in the past. In the MMT, the E.1 layer is included in a range of standardization. However, a RTP PT pool of IETF defined for each codec according to the related art appropriately reflects code-specific characteristics, such that in the case in which it is used in the MMT, very high efficiency may be achieved.

In the case of the scenario 2, an ID for distinguishing between various content components or signaling streams multiplexed in a single port stream is required.

In the case of the scenario 3, an ID for describing a coupling relation between specific content components and complementary representations separately transported over different port streams is required.

Most of the IP based transport scenarios such as the scenarios 1 to 3 have an operation requiring the ID. Here, what semantics (meaning) the allocated ID has is generally established in session description information transferred in an out-of-band (OOB) or an in-band (IB), for example, SDP in an application according to the related art. Therefore, in the IP network, all of ID fields need not to be independently disposed for each of all operations having different meanings for each scenario, and meaning of a corresponding ID may be established at a time at which a session is actually formed.

Hereinafter, a method of transporting a media content using a substream ID as a single ID field used in common as described above will be described.

Figure 5:
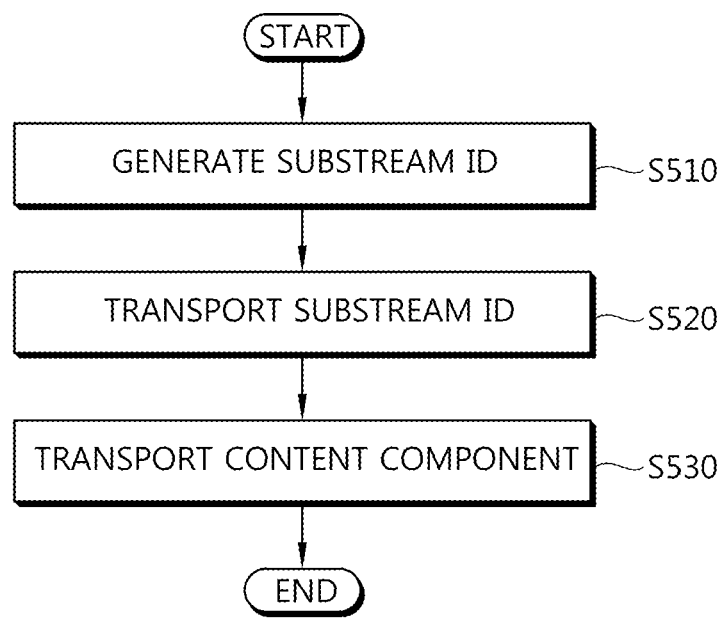
FIG. 5 is a flow chart of a method of transporting a media content according to an exemplary embodiment of the present invention.

FIG. 5 is a flow chart of a method of transporting a media content according to an exemplary embodiment of the present invention.

As shown in FIG. 5, the method of transporting a media content according to the exemplary embodiment of the present invention, which is a method of transporting a media content from a server to a client, includes generating a substream ID including information to be allocated to a port of the client in order to transport a content component including at least one of a video stream, an audio stream, and a signaling stream to the client (S510), transporting the substream ID to the client (S520), and transporting the content component to the client over at least one port of the client (S530). In the transporting of the content component to the client (S530), the content component may be transported over a heterogeneous network including an IP network. In addition, the substream ID may be used in common in multiple scenarios.

Here, in the multiple scenarios, at least one of the number of ports for transporting the media content, the number of servers transporting the media content, a type of components configuring the media content, and a coupling relation between the components may be different. That is, there may be various scenarios such as a case of using one or more port or one or more server, a case of including various types of media content components, or a case of including an additional component such as SVC, MVC, or a 3D image, as a method of transporting a media stream in an IP environment. Here, the multiple scenarios may include the above-mentioned scenarios 1 to 3, but are not limited thereto.

Again referring to FIG. 5, in the transporting of the substream ID to the client, the substream ID is included in a header of the MMT D layer and then transported to the client.

Figure 6:
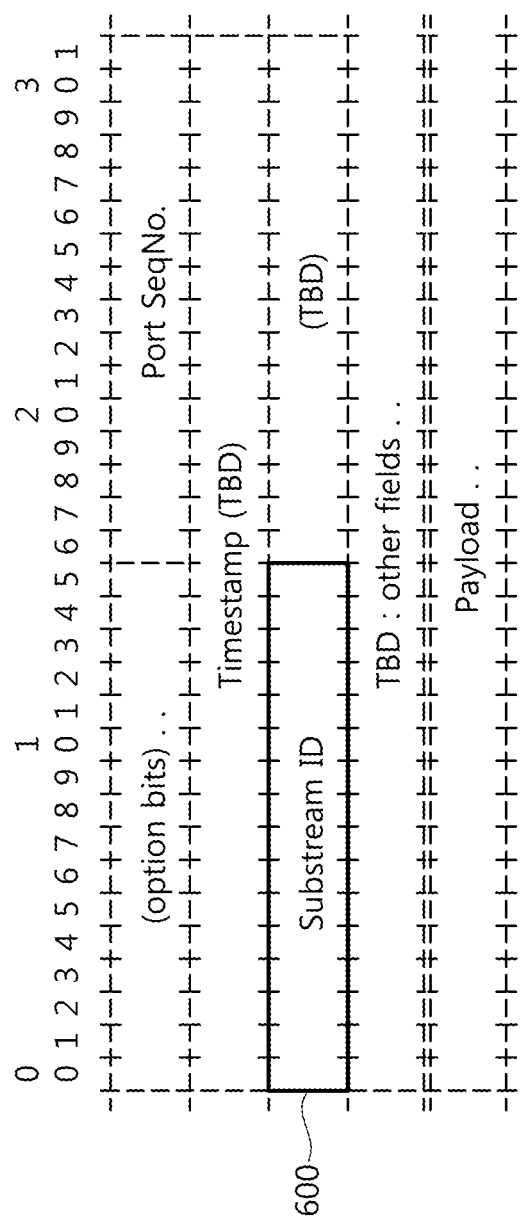
FIG. 6 is a diagram showing an example of a header description including a substream ID.

FIG. 6 is a diagram showing an example of a header description including a substream ID.

Referring to FIG. 6, a substream ID 600 used in a method of allocating an ID in order to transport a media content according to an exemplary embodiment of the present invention is configured of a field of 2 bytes. Here, the 2 bytes are a length determined in a range satisfying the following requirements.

(1) It should be enough to receive an application to be newly introduced in future.

(2) It should be enough to distinguish between all content components and various signaling streams in a presentation configured of one or two or more media contents (programs).

It should completely receive 7 bits of an RTP PT to have backward compatibility with an existing RTP PT standard and a SDP based operation scheme.

(4) It should be able to receive a stream_type (8 bits) and a stream_id (8 bits) of an MPEG2-TS.

(5) It should be able to receive a PID (13 bits) of an MPEG2-TS.

(6) It should be byte alignment friendly.

Example of Scenario

Figure 7:
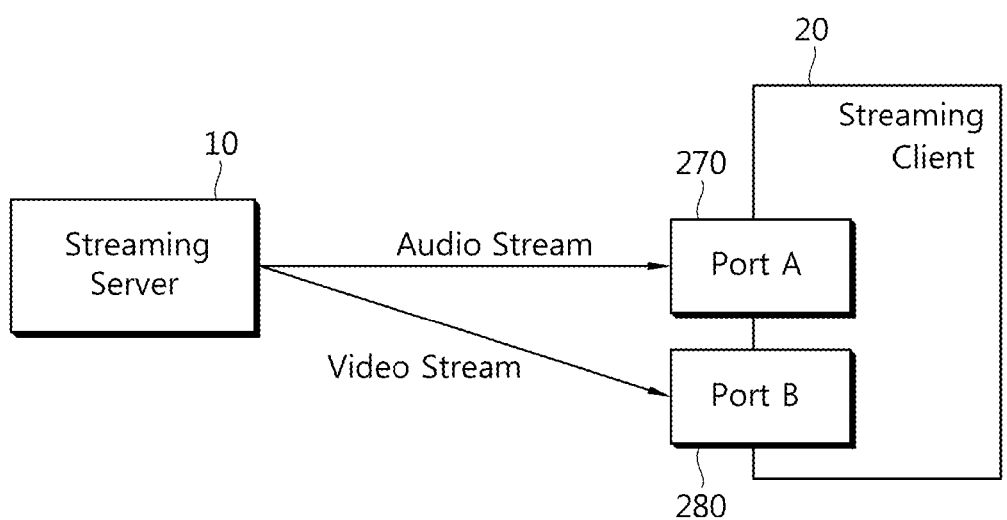
FIG. 7 shows a case in which a single content component is transported over a single port.

FIG. 7 shows a case in which a single content component is transported over a single port. As described above, the substream ID may include required information in order to transport a media content based on one of the multiple scenarios.

As shown in FIG. 7, one of the multiple scenarios may be characterized in that a single content component is transported over a single port. For example, in transporting a media content from a server 10 to a client 20, an audio stream may be transported using a port A 270, and a video stream may be transported using a port B 280.

Here, the substream ID may indicate a type of the content component. For example, the substream ID may signal that a specific payload type is being used. For example, the substream ID may be allocated as follows:

i. Audio: 0000 0001 0000 0001 (binary)
ii. Video: 0000 0001 0000 0010 (binary)

Figure 8:
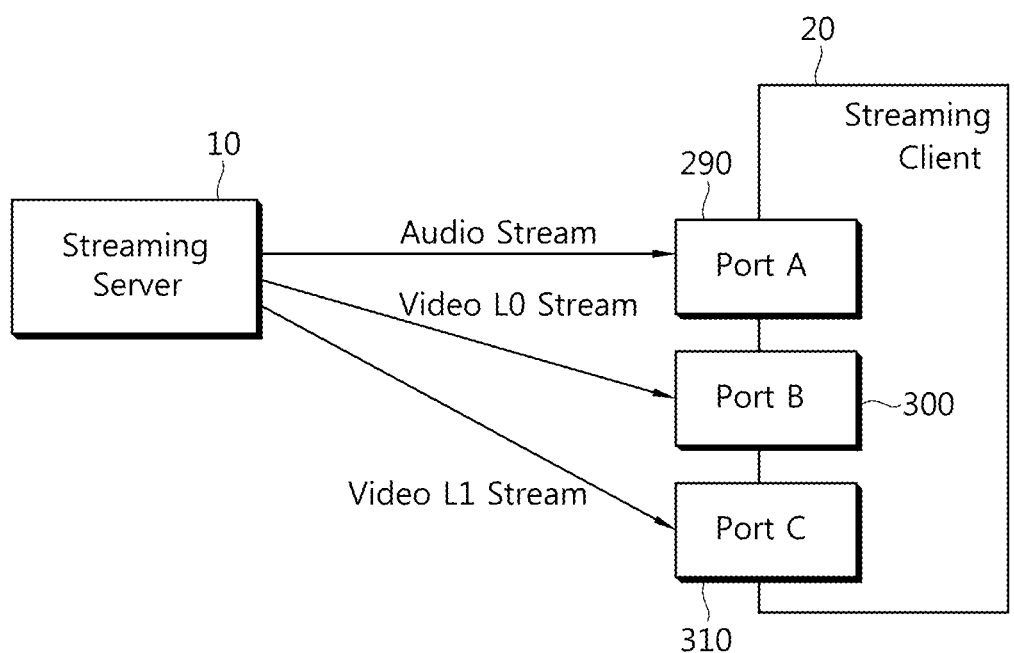
FIG. 8 shows a case in which a single content component is transported over a single port and a media content including a complementary representation is transported.

FIG. 8 shows a case in which a single content component is transported over a single port and a media content including a complementary representation is transported. As described above, the substream ID may include required information in order to transport a media content based on one of the multiple scenarios.

As shown in FIG. 8, one of the multiple scenarios may be characterized in that an additional complementary representation for implementing any one of SVC, MVC, and a 3D image and at least one content component are transported to a client. For example, in transporting a media content from a server 10 to a client 20, an audio stream may be transported to the client 20 using a port A 290, and a video L0 stream may be transported to the client 20 using a port B 300, and a video L1 stream may be transported to the client 20 using a port C 310. Although not shown in FIG. 8, in the case of MVC, video streams of different views may be transported over multiple ports, and in the case of a 3D image, left and right images or a reference image and an additional image may be transported over the multiple ports.

Here, the substream ID may indicate a coupling relation between the additional complementary representation and the content component. In addition, the substream ID may also include information indicating types of each content component and complementary representation. For example, the substream ID may signal that a specific payload type is being used. For example, the substream ID may be allocated as follows:

i. Audio: 0000 0001 0000 0001 (binary)
ii. Video: 0000 0001 0000 0010 (binary)
iii. SVC Video Layer-1: 0000 0001 0000 0011 (binary)

Figure 9:
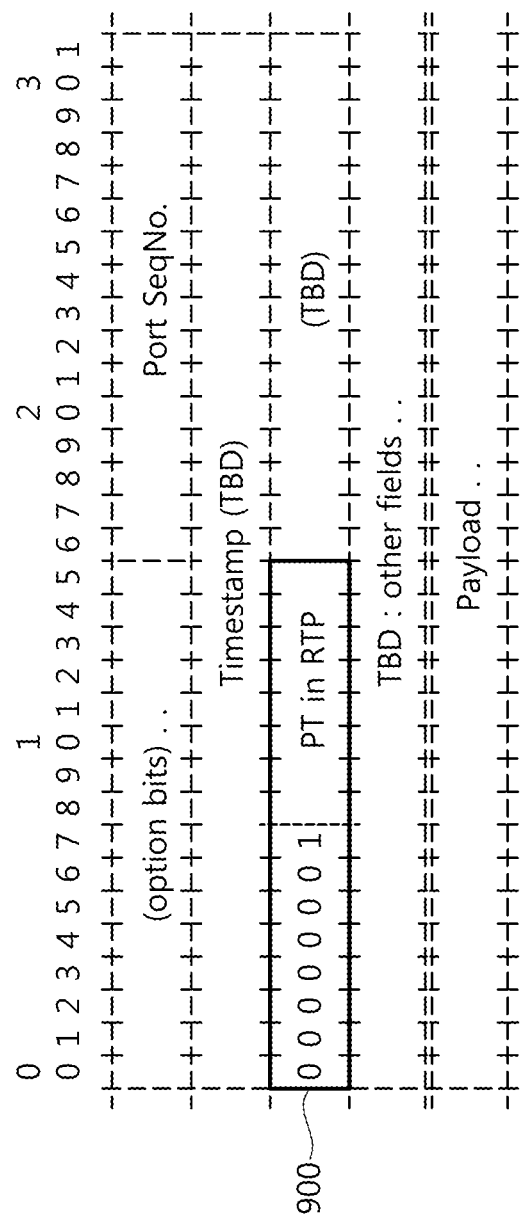
FIG. 9 shows a case of supporting backward compatibility with an RTP payload type (PT).

FIG. 9 shows a case of supporting backward compatibility with an RTP payload type (PT). As described above, the substream ID may include required information in order to transport a media content based on one of the multiple scenarios.

Here, one of the multiple scenarios may be characterized in that a single component is transported over a signal port and support the backward compatibility with the RTP PT. In allocating the substream ID, an upper byte of 0000 0001 may be reserved for a RTP TP compatibility mode as shown in FIG. 9. That is, the substream ID may further include information for supporting the backward compatibility with the existing RTP PT.

Figure 10:
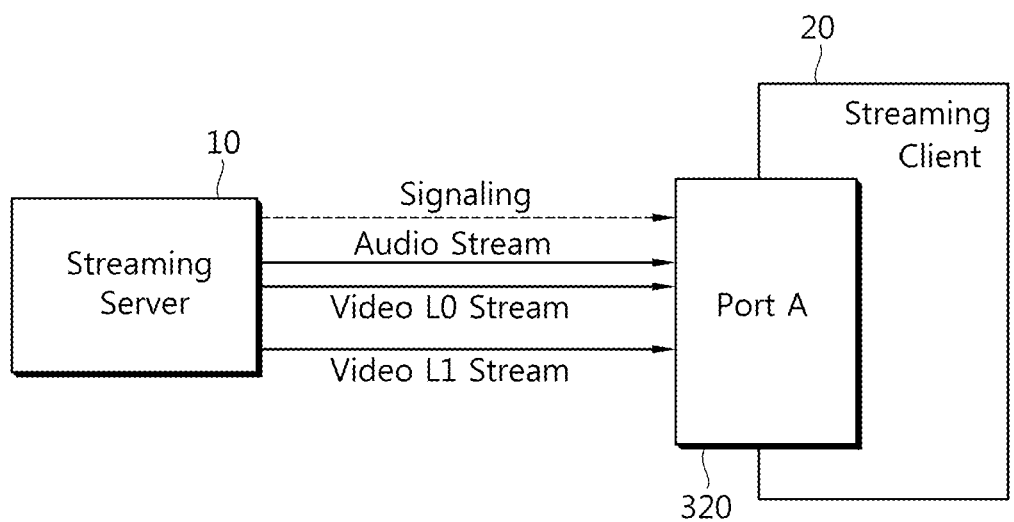
FIG. 10 shows a case in which multiple content components and signaling streams are multiplexed and transported over a single port.

FIG. 10 shows a case in which multiple content components and signaling streams are multiplexed and transported over a single port. As described above, the substream ID may include required information in order to transport a media content based on one of the multiple scenarios.

As shown in FIG. 10, one of the multiple scenarios may be characterized in that multiple content components are multiplexed and transported over a single port. For example, in transporting a media content from a server 10 to a client 20, an audio stream and a video stream may be transported to the client 20 over a port A 320. In the case of SVC, as shown in FIG. 10, all of an audio stream, a video L0 stream, and a video L1 stream may be transported to the client 20 over the port A 320.

Here, the substream ID may include information for distinguishing between the multiple content components. For example, the substream ID may be used in order to distinguish between different media content components in a single port stream. For example, the substream ID may be allocated as follows:

i. Audio: 0000 0001 0000 0001 (binary)
ii. SVC Video Layer-0: 0000 0001 0000 0010 (binary)
iii. SVC Video Layer-1: 0000 0001 0000 0011 (binary)

Here, one of the multiple scenarios may be characterized in that signaling streams are further transported over the signal port, and the substream ID may be characterized in that it includes information for distinguishing between the multiple content components and the signaling streams.

Figure 11:
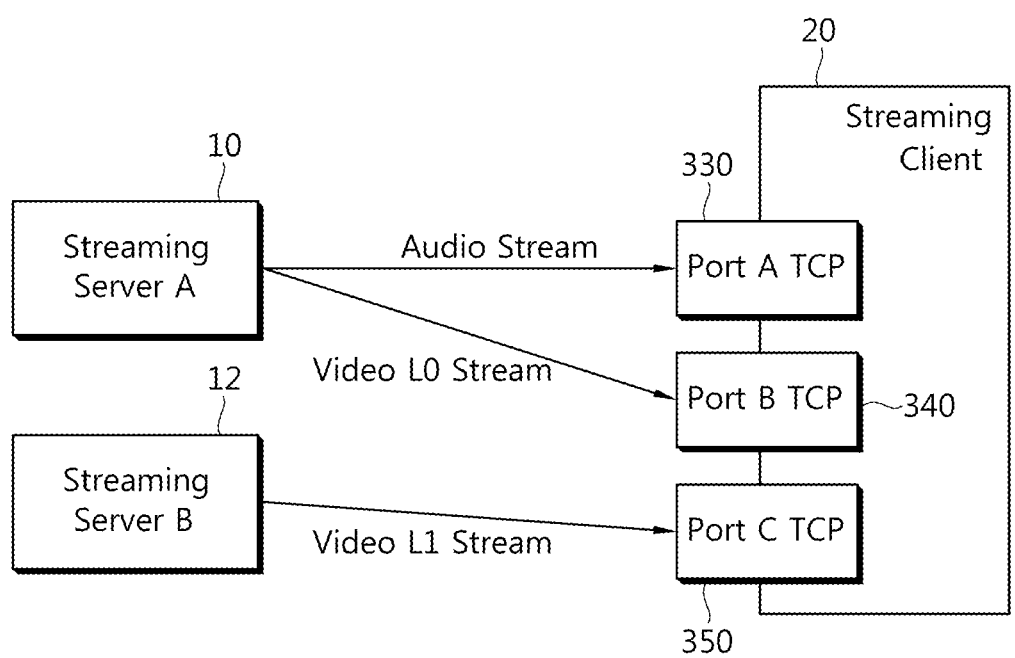
FIG. 11 shows a case in which a content component is transported to at least one client over multiple servers.

FIG. 11 shows a case in which a content component is transported to at least one client over multiple servers. As described above, the substream ID may include required information in order to transport a media content based on one of the multiple scenarios.

Here, one of the multiple scenarios may be characterized in that the content component is transported from multiple servers to at least one single client. For example, as shown in FIG. 11, in transporting a media content from a server A 10 and a server B 12 to a client 20, an audio stream may be transported from the server A 10 to the client 20 over a port A 330, a video L0 stream may be transported from the server A 10 to the client 20 over a port B 340, and a video L1 stream may be transported from the server B 12 to the client 20 over a port C 350.

Here, the substream ID may include information for distinguishing between the multiple servers. For example, the substream ID may be used in order to distinguish between different media content components or signaling streams transported in different port streams. The substream ID may be allocated as follows:
i. Audio: 0000 0001 0000 0001 (binary)
ii. SVC Video Layer-0: 0000 0001 0000 0010 (binary)
iii. SVC Video Layer-1: 0000 0001 0000 0011 (binary)

Figure 12:
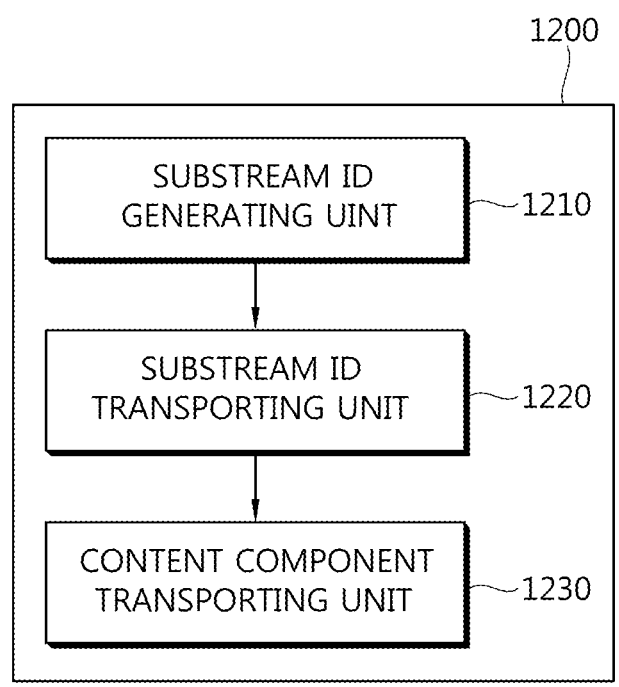
FIG. 12 is a block diagram showing a configuration of an apparatus of transporting a media content according to an exemplary embodiment of the present invention.

FIG. 12 is a block diagram showing a configuration of an apparatus of transporting a media content according to an exemplary embodiment of the present invention.

As shown in FIG. 12, the apparatus 1200 of transporting a media content according to the exemplary embodiment of the present invention may include a substream ID generating unit 1210 generating a substream ID including information to be allocated to a port of a client in order to transport a content component including at least one of a video stream, an audio stream, and a signaling stream to the client, a substream ID transporting unit 1220 transporting the substream ID to the client, and a component transporting unit 1230 transporting the content component to the client over at least one port of the client. The component transporting unit 1230 may transport the content component over a heterogeneous network including an IP network. In addition, the substream ID may be used in common in multiple scenarios.

Here, in the multiple scenarios, at least one of the number of ports for transporting the media content, the number of servers transporting the media content, a type of components configuring the media content, and a coupling relation between the components may be different. The substream ID transporting unit 1220 may allow the substream ID to be included in a header of an MMT D layer and then transport the substream ID to the client. In addition, the substream ID may include information for supporting the backward compatibility with the existing RTP PT.

In one of the multiple scenarios, multiple content components may be multiplexed and transported over a signal port, and the substream ID may include information for distinguishing between the multiple content components.

In one of the multiple scenarios, signaling streams may be further transported over the signal port, and the substream ID may include information for distinguishing between the multiple content components and the signaling streams.

In one of the multiple scenarios, an additional complementary representation for implementing any one of SVC, MVC, and a 3D image may be further transported from the server to the client, and the substream ID may further include information for describing a coupling relation between the additional complementary representation and the content component.

In one of the multiple scenarios, the content component may be transported from the multiple servers to at least one client, and the substream ID may further include information for distinguishing between the multiple servers.

A detailed operation of the apparatus of transporting a media content according to the exemplary embodiment of the present invention is in accordance with the method of transporting a media content described above.

The invention claimed is:

1. A server, comprising:
a transport port; and
a receiving port,
wherein the server is configured to generate a media unit by encapsulating a media fragment unit (MFU), an asset based on the media unit, and a packet by packetizing the media unit, the MFU being a fragment of the media unit, the media unit being a container for independently decodable data, the asset being a data entity configured of one or more media units,
wherein the generating of the packet includes generating the packet to include a field for distinguishing a media content component in the packet from other media content components, and
wherein the field is in a packet header of the packet.

2. The server of claim 1, further comprising one or more transport ports,
wherein the server generates a stream that includes the packet to be output to a heterogeneous network through the one or more transport ports.

3. The server of claim 1, wherein the server generates the packet to include the field regardless of whether at least one of a type of the media content components and a coupling relation between the media content components is different.

4. The server of claim 1, wherein the media content component is an asset.

5. The server of claim 1, wherein the field includes information for supporting backward compatibility with an existing RTP payload type (PT).

6. The server claim of 1, wherein, when multiple content components are multiplexed and to be transported over a single port, the field includes information for distinguishing between multiple content components.

7. The server of claim 6, where, when signaling streams are to also be transported over the signal port, the field includes information for distinguishing between multiple content components and signaling streams.

8. The server of claim 1, wherein the field includes information for describing a coupling relation between the media content component and one or more other complementary packetized media conforming with any one of scalable video coding (SVC), multi-view coding (MVC), and 3D image.

9. A method for generating a media stream, the method comprising:
generating a media unit through encapsulating a media fragment unit (MFU);
generating an asset based on the media unit; and generating a packet by packetizing the media unit, the MFU being a fragment of the media unit, the media unit being a container for independently decodable data, the asset being a data entity configured of one or more media units, wherein the generating of the packet further comprises including, in the packet, a field for distinguishing a media content component in the packet from other media content components, wherein the field is in a packet header of the packet.

10. The method of claim 9, further comprising transporting the packet to a receive side, wherein the transporting comprises transporting the packet over a heterogeneous network.

11. The method of claim 9, wherein the field is used in scenarios in which at least one of a type of the media content component and a coupling relation between the media content components is different.

12. The method of claim 9, wherein the media content component is an asset.

13. The method of claim 9, wherein the field includes information for supporting backward compatibility with an existing RTP PT.

14. The method of claim 9, wherein multiple media content components are multiplexed and transported over a single port, and the field includes information for distinguishing the multiple media content components.

15. The method of claim 14, wherein signaling streams are transported over the signal port, and the field includes information for distinguishing the multiple media content components and the signaling streams.

16. The method of claim 9, wherein an additional complementary representation for implementing any one of SVC, MVC, and a 3D image is transported, and the field includes information for describing a coupling relation between the additional complementary representation and the media content component.

* * * * *